Figure 1:
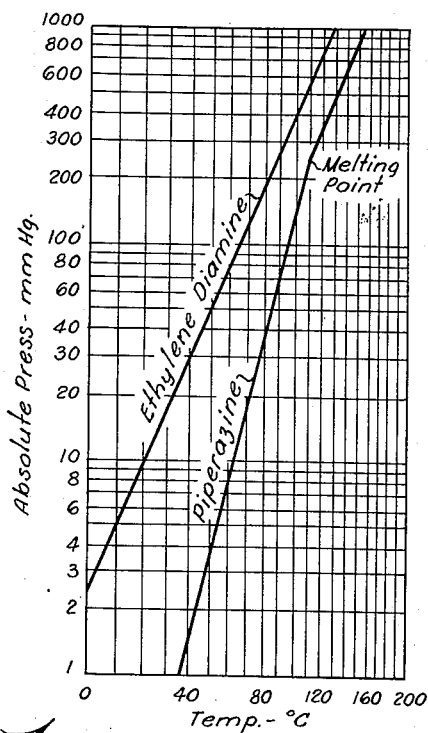

INVENTOR.
Scott Lynn
BY
Griswold & Burdick
ATTORNEYS

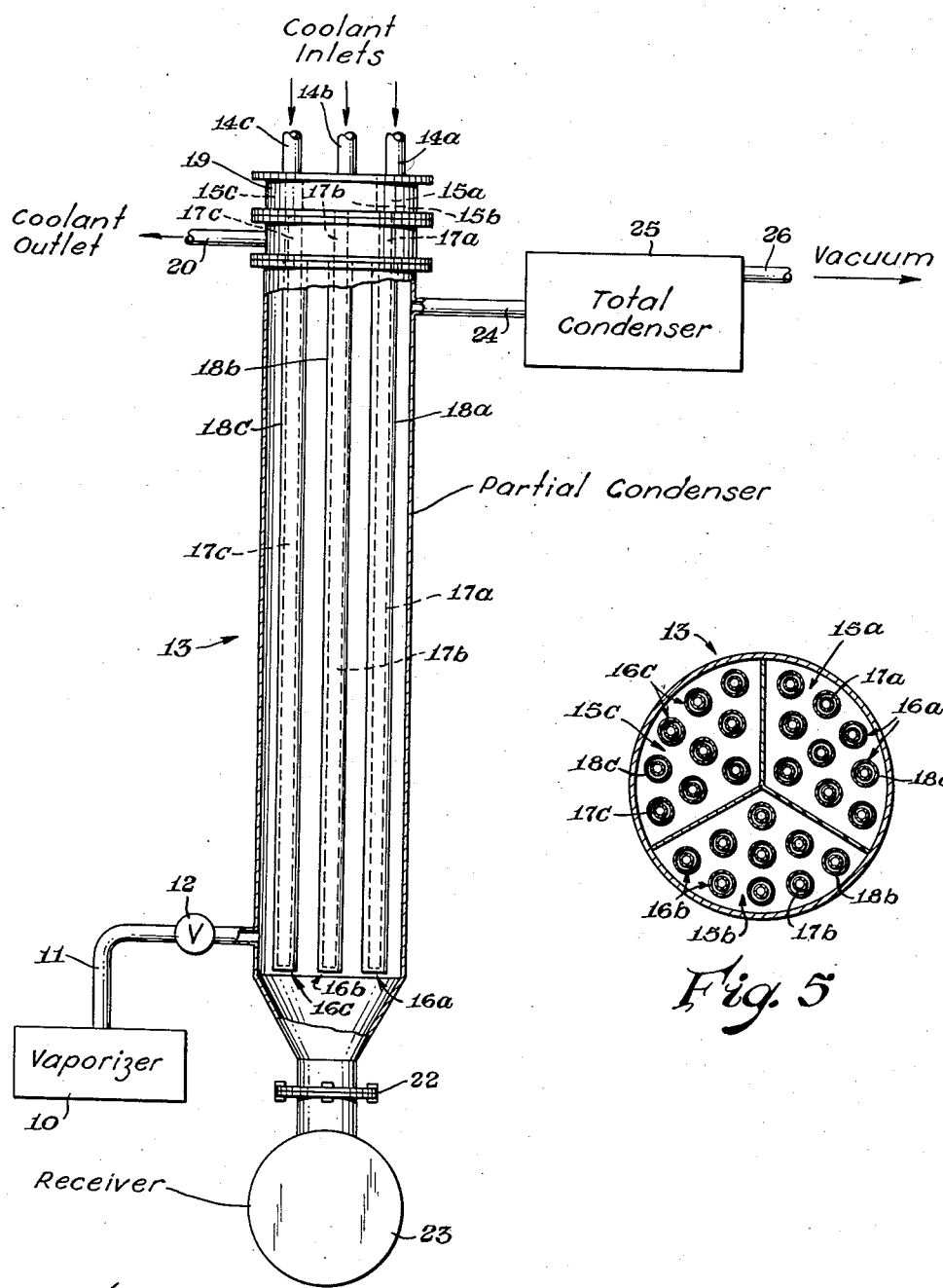

United States Patent Office 2,852,517
Patented Sept. 16, 1958

2,852,517

SEPARATING METHOD

Scott Lynn, Midland, Mich., assignor to The Dow Chemical Company, Midland, Mich., a corporation of Delaware Application November 7, 1955, Serial No. 545,494

7 Claims. (Cl. 260—268)

This invention relates to a method for separating mixtures of relatively volatile substances by desublimation from the vapor state.

Numerous miscible substances which have an appreciable volatility at ordinary temperatures, including many isomeric varieties of chemical compounds, may not be separated either conveniently or effectively from mixtures by distillation techniques. This is especially the case when the substances boil at very high temperatures or may tend to decompose near their boiling points or when they have identical or closely parallel vapor pressure characteristics as liquids. It usually is extremely difficult and may sometimes be impossible to separate mixtures of substances having such a physical relationship by distillation. This, of course, is because the composition of vapors from liquid mixtures of such substances may not differ appreciably from the composition of the mixtures which are desired to be separated with respect to the relative proportions of the substances which they contain. Thus the distillation of mixtures of such substances to obtain an effective separation, even by fractional distillation, may not be permissible.

If the substances involved have distinct and separate freezing points and do not form solid solutions, they may in some instances be separated by the utilization of crystallization techniques. In such a procedure, one of the substances may be crystallized from solution with the other or out of some mutual solvent. However, in order to obtain a satisfactory isolation of one of the substances in a suitably pure form, particularly when relatively greater purity is desired in the isolated product, it is frequently necessary to perform several successive recrystallizations or a fractional crystallization of the substances. Such procedural requirements are not only tedious and exacting but may also involve the application of relatively costly unit operations.

It would be advantageous for a method to be available for separating mixtures of appreciably volatile substances having distinct freezing points so that one of the substances could be isolated effectively in a single operation in which the desired isolated substance would be obtained in a relatively pure condition.

This result and other benefits can be realized according to the method of the present invention which comprises vaporizing, at a given temperature, a mixture containing at least two substances having appreciable volatilities and distinct freezing points to form a mixed vapor which contains said vaporized substances; then exposing the mixed vapor to a condensing surface maintained at a temperature which is lower than said vaporizing temperature and beneath the freezing point of only the highest melting of said substances while said mixed vapors are under a pressure which is less than the vapor pressure at equilibrium of a saturated liquid solution of the substances at the temperature of said condensing surface. The highest melting of the substances desublimates from the mixed vapor to the condensing surface until its partial pressure in the mixed vapor does not exceed its vapor pressure at the temperature of the condensing surface. Accumulations of the condensed highest melting substance may advantageously be removed in a substantially pure form from the condensing surface at periodic intervals. The intervals may, with expedience, be so spaced that the deposited quantities of the desublimated substance do not interfere with the heat transferring efficiency of the condensing surface. This may be accomplished by various means, including mechanical means for removing the adhering desublimated deposits. Preferably, however, the condensing surface is cleaned of adhering deposits by periodically raising its temperature to a point at which the vapor pressure of the desublimated substance exceeds the pressure under which the mixed vapors are being maintained. This partially vaporizes the desublimated substance in the vicinity of the condensing surface to permit the bulk of the thus released deposit to be removed easily. If an inclined or vertical condensing surface is employed, for example, the released deposits falling from the condensing surface can be collected in a suitable receiver positioned underneath. The remaining mixed vapors may be recovered in a subsequent total condensing operation or may be recovered or disposed of otherwise.

The present invention is advantageously practiced with binary mixtures of volatile substances although a desired substance can be recovered in accordance with the invention from a mixture with any number of other volatile or non-volatile substances provided they do not interreact chemically or form solid solutions with one another. Practice of the invention is especially beneficial for the separation of mixtures of substances which have closely parallel or substantially similar volatilities and vapor pressure characteristics in the liquid state, but distinct and dissimilar melting or freezing points. It is particularly beneficial when applied to the separation of substances which are more commonly separated by crystallization from liquid solutions and which have an appreciable volatility at ordinary temperatures. It is highly efficacious, for example, for the effective separation of mixtures of various organic compounds, including piperazine mixtures and mixtures of certain isomeric piperazine derivatives. However, other substances which may have an appreciable volatility of at least about 0.01 mm. Hg at a desired operating temperature may also be satisfactorily separated from mixtures according to the method of the present invention.

Figure 3:
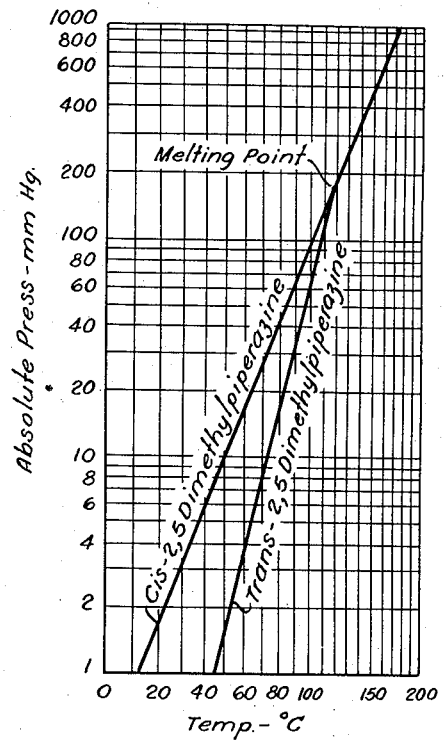
Figure 2:
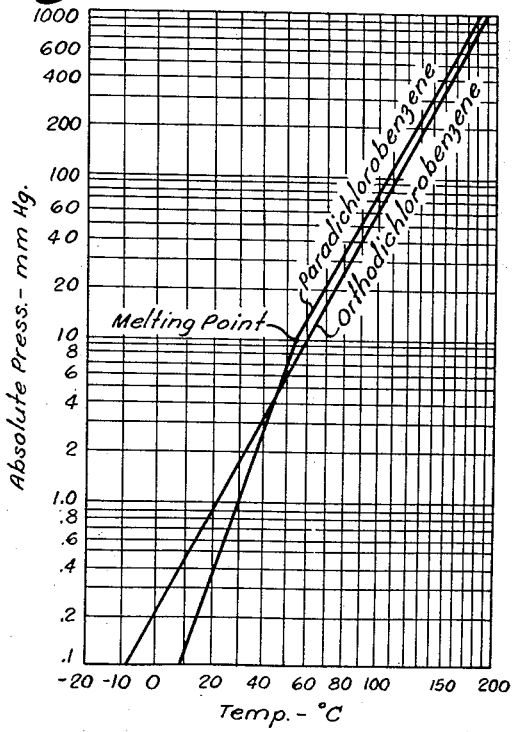

Further features and advantages of the present invention will be more apparent in the following description in connection with the drawing, wherein:

Figures 1–3 are graphs which depict the variation in the vapor pressures with temperature of several compared substances;

Figure 4 schematically illustrates one embodiment of an apparatus with which the invention may advantageously be practiced; and Figure 5 illustrates the arrangement of a particular type of condensing surface which may be employed.

Referring initially to Figures 1–3 of the drawing, there are plotted in the form of Cox charts the relationships between the vapor pressure and temperature for several compared substances. In each of the graphs the vapor pressures of the substances in millimeters of mercury are ploted as ordinates on a logarithmic scale against the temperature in degrees centigrade as the abscissas. In Figure 1, ethylene diamine and piperazine are compared. Figures 2 and 3 respectively illustrate the relationships for paradichlorobenzene-orthodichlorobenzene; and cis-2,5-dimethylpiperazine and trans-2,5-dimethylpiperazine. The sharp break in the curves depicted for piperazine, paradichlorobenzene and trans-2,5-dimethylpiperazine indicate their melting or freezing points. Condensation of any of these materials at a temperature falling beneath the sharp break in the curve which denotes their freezing points would result in their being desublimed or directly transferred from a vapor to a solid state without passing through a liquid phase.

The method of the present invention may advantageously be conducted with apparatus similar to that depicted schematically in Figure 4. A mixture of the substances which is desired to be separated is vaporized at a given temperature in a vaporizer 10. Preferably there are no inert gases such as air and the like or other materials above their critical points in the mixed vapors of the substances to be separated. Although the presence of such materials can be tolerated in small amounts, they are undesirable in that they reduce the productive capacity of any particular apparatus being operated with a given vapor throughput. Advantageously, the vaporizing temperature is sufficiently high to cause the mixed substances to vaporize from a substantially complete liquid phase. This results in better heat transfer conditions for the substances being vaporized in the vaporizer 10. The mixed vapors thereby produced pass through a conduit 11 and a throttling or control valve 12 to be admitted to a partial condenser 13, having therein disposed a condensing surface comprised of a plurality of fingers 16a, 16b and 16c, under a controlled pressure which is less than the vapor pressure at equilibrium of a saturated liquid solution of the substances at the temperature of the condensing surfaces 16a, 16b and 16c. Advantageously, although other surface arrangements may be employed, the condensing surface is in the form of the vertically disposed tubular fingers having outer condensing walls 18a, 18b and 18c which are cooled by passage of a suitable coolant from inner supply tubes 17a, 17b and 17c through the annular spaces between the outer walls and the inner tubes. The condensing surface on the fingers is maintained at a temperature which is beneath the freezing point of the highest melting substance in the mixed vapors. If desired, their temperature may be maintained at a point just above the freezing point of the next highest melting substance in the mixed vapors while, as mentioned, the pressure of the mixed vapors is advantageously maintained at a point which is not in excess of the vapor pressure of a saturated liquid solution of the substances at the temperature of the condensing surface. The pressure of the mixed vapors in the partial condenser 13 can be effectively controlled by adjusting the valve 12 to regulate their passage from the vaporizer 10.

The highest melting of the substances in the mixed vapors desublimes on the condensing surface of the fingers 16a, 16b and 16c until its partial pressure in the mixed vapor about equals its vapor pressure at the temperature of the condensing surface. Necessarily, as mentioned, the temperature of the condensing fingers 16a, 16b and 16c is maintained at some point beneath the temperature of the mixed substances being vaporized in the vaporizer 10.

Each of the condensing fingers 16a, 16b and 16c, which may schematically be taken as representative of any desired plurality of similar fingers in the partial condenser 13, may be provided with separate coolant supply means. This allows their temperatures to be regulated independently. Thus, the condensing finger (or like plurality of fingers, not shown in Figure 4) 16a may be provided with a coolant, such as chilled water, brine or the like, from an inlet pipe 14a which supplies a coolant inlet header 15a to which the inner supply tube or tubes 18a of the finger or fingers 16a is or are connected. Separate coolant inlet pipes 14b and 14c may be employed in a similar fashion to provide the coolant independently to the fingers 16b and 16c. All of the fingers 16a, 16b and 16c may conveniently be discharged of coolant from the annular spaces between the outer walls 18a, 18b and 18c and inner supply tubes 17a, 17b and 17c respectively through a common outlet header 19 which is emptied by a coolant outlet pipe 20. Such an arrangement advantageously facilitates cleaning a portion of the condensing fingers of adhering product without disrupting the entire desublimation operation, especially when the fingers are in an inclined or vertical position. Thus the temperature of any of the finger groups 16a, 16b or 16c can be temporarily elevated to the point at which the vapor pressure of the adhering highest melting substance exceeds that of the mixed vapors in the partial condenser to vaporize the portion of the desublimed substance against the condensing surface. This releases the adhering deposit from the vertical fingers, permitting it to fall for recovery into a product receiver 23 which is detachably connected to the bottom of the partial condenser 13 by means of a suitable coupling flange 22. A good portion of the highest melting substance thus temporarily vaporized may be recovered in this manner on the condensing surface of the other unwarmed fingers. A partial cleaning of the condensing surface when it is required to recover the desublimed product may be alternatively accomplished among the independently controlled condensing fingers at periodic intervals spaced to maintain an optimum operating efficiency.

The uncondensed portion of the mixed vapors is then passed as overhead vapors through a conduit 24 to a total condenser 25 which removes them from the vapor state. The pressure in the partial condenser 13 may advantageously be regulated from a vacuum source (not shown) which is connected through a conduit 26 to the total condenser.

In Figure 5 a desirable arrangement for a plurality of condensing fingers forming a condensing surface in the partial condenser 13 is shown. As is illustrated, twenty-seven fingers are employed in all. They are independently temperature controlled in three separate groups or units of nine fingers each. Thus the coolant for the nine fingers 16a is admitted simultaneously from the header 15a through the inner tubes 17a to cool the condensing surfaces on the outer walls 18a. The fingers 16b and 16c are similarly arranged in groups of nine. If it is preferred, other types of condensing surfaces may also be effectively employed. Thus plane surfaces may be utilized on which to desublime the substance being separated as well as surfaces having any other desired configuration. In addition, in large scale operations, it may be advantageous to employ a plurality of consecutive condensing plates operating at progressively lower temperatures beneath the freezing point of the highest melting substance. This may provide a greater operating efficiency and permit a more uniform desublimation to occur over the entire available condensing surface.

In order to further illustrate the invention the following examples are given.

*Example I*

Using an apparatus patterned after that depicted in Figure 4 and having a total of twenty-seven condensing fingers, a mixed vapor consisting of about two-thirds ethylene diamine and one-third piperazine was generated from a mixture of the two at a temperature of about 50° C. The mixed vapor, under an absolute total pressure of about 10 mm. Hg, was passed through a partial condenser in which the condensing surface was maintained at about 27° C. Solid piperazine having a purity of about 99.3 percent by weight and a melting point of about 111.8° C. was obtained by disublimation on the condensing surface. The purified and separated product was found to contain only about 0.12 percent by weight of ethylene diamine, the balance being water which had been hygroscopically accumulated. The overhead mixed vapors which were then passed to the total condenser contained only about 5.0 percent by weight of piperazine.

Example II

The procedure of Example I was repeated with a vapor consisting of about four-fifths of paradichlorobenzene and one-fifth of orthodichlorobenzene. The partial condenser was operated under about 2 mm. Hg pressure and with the condensing surface at a temperature of about 26° C. The desublimed product paradichlorobenzene which was obtained had a melting point of about 53.0° C., indicating a product purity of about 99.7 mol percent.

Example III

A mixed vapor consisting of about equal parts of trans-2,5-dimethylpiperazine and cis-2,5-dimethylpiperazine was separated according to the procedure of Example I excepting that the pressure of the pressure of the partial condenser was about 2 mm. Hg and the condensing surface was maintained at about 17° C. Solid trans-2,5-dimethylpiperazine was desublimed on the condensing surface. The product had a purity of at least about 98.5 percent by weight as indicated by its melting point of about 115.6° C.

Example IV 1,2,3,5-tetrachlorobenzene can be desumblimed in a substantially pure form having a melting point of about 138° C. from a mixed vapor with 1,2,3,4-tetrachlorobenzene according to the general procedure of Example I by operating at a pressure of about 0.4 mm. Hg with a partial condensing surface at a temperature of about 50° C.

Since certain changes and modifications in the practice of the present invention can readily be entered into without substantially departing from its intended spirit and scope, it is to be fully understood that all of the foregoing be construed and interpreted as merely being represented of certain of the preferred embodiments of the invention.

What is claimed is:

1. Method for separating a mixture of at least two substances having appreciable volatilities and distinct freezing points, which substances have substantially similar vapor pressure characteristics in the liquid state and dissimilar vapor pressure characteristics beneath the freezing point of the highest melting of said substances in that, at any given temperature beneath said point, said highest melting substance has the lowest vapor pressure, which process comprises vaporizing the mixture at a given temperature at which said substances are liquid to form a mixed vapor which contains said vaporized substances; then exposing the mixed vapor to a condensing surface maintained at a temperature which is lower than said vaporizing temperature and beneath the freezing point of only the highest melting of said substances while said mixed vapors are under a pressure which is less than the vapor pressure at equilibrium of a saturated liquid solution of the substances at the temperature of said condensing surface; desublimating said highest melting substance on said condensing surface; and removing the desublimated highest melting substance from said condensing surface.

2. The method of claim 1 wherein said condensing surface is inclined and wherein said desublimated substance is removed from said surface by temporarily raising the temperature of at least part of said surface to a point at which the vapor pressure of the desublimated substance exceeds the pressure under which the mixed vapors are being maintained until the desublimated substance adjacent to the part of said condensing surface vaporizes to release the balance of said substance adhering to said part of said surface.

3. The method of claim 2 wherein said condensing surface is inclined in a substantially vertical position.

4. The method of claim 1 wherein the mixture to be separated is a binary mixture consisting of ethylene diamine and piperazine.

5. The method of claim 1 wherein the mixture to be separated is a binary mixture consisting of paradichlorobenzene and orthodichlorobenzene.

6. The method of claim 1 wherein the mixture to be separated is a binary mixture consisting of trans-2,5-dimethylpiperazine and cis-2,5-dimethylpiperazine.

7. The method of claim 1, wherein the vaporization and subsequent exposure of the resulting vapors is performed in a system that is substantially free from gases and other materials above their critical non-condensing points.

References Cited in the file of this patent

UNITED STATES PATENTS 1,685,624    Andrews _____ Sept. 25, 1928